UNITED STATES PATENT OFFICE.

ARTHUR WEINBERG, OF FRANKFORT-ON-THE-MAIN, GERMANY, ASSIGNOR TO LEOPOLD CASSELLA & CO., OF SAME PLACE.

PHENYLAMIDONAPHTHOLSULFO ACID.

SPECIFICATION forming part of Letters Patent No. 537,511, dated April 16, 1895.

Application filed September 7, 1894. Serial No. 522,341. (Specimens.)

*To all whom it may concern:*

Be it known that I, ARTHUR WEINBERG, a citizen of Prussia, and a resident of Frankfort-on-the-Main, Germany, have invented new and useful Improvements in the Production of Phenylamidonaphtholsulfo Acid, of which the following is a specification.

My invention is based upon the discovery that the amido group in the amidonaphtholsulfo acid described in United States Letters Patent No. 454,645 can be phenylated by observing suitable conditions without the hydroxyl or the sulfo group taking part in the reaction and, especially acids in which the hydroxyl group stands in the alpha position, can easily, and in theoretical quantity, be transformed into their phenyl derivatives. As a typical example of such an acid the gamma amidonaphtholsulfo acid may be considered. If this acid is heated with anilin or its homologues in presence of means of condensation such as hydrochlorate of anilin, an acid of the following constitution is formed:

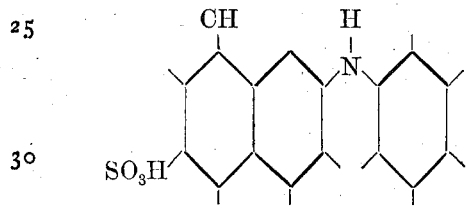

In carrying out this invention I proceed for instance as follows: Twenty-five kilos gamma amidonaphtholsulfo acid and twenty-five kilos hydrochlorate of anilin are dissolved in one hundred kilos anilin and the solution is cautiously heated up to 160° centigrade. This temperature is maintained for four or five hours. The termination of the reaction is ascertained in the following manner: To a sample, an excess of diluted acid is added, the resulting precipitate is filtered off, washed and distributed in acidulated water, some nitrite of soda is added and then the solution is tested, whether an alkaline solution of R salt still produces a color reaction. As soon as a color reaction can no longer be noticed in a sample, the melt is allowed to run into a solution of one hundred and twenty kilos muriatic acid of 21° Baumé and five hundred liters water. The phenylamidooxynaphthalenesulfo acid separates. It is filtered off and washed out with water.

The acid thus obtained is almost perfectly pure. It forms colorless small needles. It is difficultly soluble in water. If the acid is suspended in acidulated water and nitrite of soda is added, it is transformed into oxynaphtylphenylnitrosaminsulfo acid which is easily soluble in water. In alkalies the acid dissolves by forming easily soluble salts. It easily reacts like the non-phenylated acid with diazo-and tetrazo-compounds forming valuable dye stuffs which generally are more difficultly soluble and darker in shade than the corresponding derivatives of the non-phenylated acid.

Having thus described my invention, what I claim as new, and desire to secure by Letters Patent, is—

1. The process of producing phenylamidonaphtholsulfo acid by heating gamma-amidonaphtholsulfo acid herein described with aromatic amines in presence of means of condensation such as hydrochlorate of anilin, substantially as described.

2. As an article of manufacture the new phenylamidonaphtholsulfo acid having the chemical constitution:

$$C_{10}H_5.SO_3H.OH.NH_2-C_6H_5$$

which is difficultly soluble in water, easily soluble in alkalies, being transformed into an easily soluble oxynaphtylphenylnitrosaminsulfo acid by the action of nitrous acid and forming dyestuffs with diazo or tetrazo compounds substantially as described.

In testimony that I claim the foregoing as my invention I have signed my name, in presence of two witnesses, this 25th day August, 1894.

ARTHUR WEINBERG.

Witnesses:
ALVESTO S. HOGUE,
JEAN GRUND.